May 8, 1951 P. BLAIR 2,552,028
ELECTRIC MOTOR TERMINAL BLOCK
Filed Sept. 9, 1948 3 Sheets-Sheet 1

Inventor:
Preston Blair
By: Wallace and Cannon
Atty's.

May 8, 1951          P. BLAIR          2,552,028

ELECTRIC MOTOR TERMINAL BLOCK

Filed Sept. 9, 1948          3 Sheets-Sheet 2

Inventor:
Preston Blair
By: Wallace and Cannon
Atty's.

Patented May 8, 1951

2,552,028

UNITED STATES PATENT OFFICE 2,552,028

ELECTRIC MOTOR TERMINAL BLOCK

Preston Blair, Chicago, Ill.

Application September 9, 1948, Serial No. 48,521

17 Claims. (Cl. 172—280)

This invention relates to terminal blocks for dynamo-electric machines and more particularly to terminal blocks which are especially well adapted for use on dynamo-electric machines of the multiple-winding, multi-phase type.

Dynamo-electric machines of the multi-phase type, such as, for example, multiple-wound, polyphase motors, are well known in the art. Such machines customarily have a plurality of wires therein, such as lead wires, extending from the coils of the machine, and the like, which, during operation of the machine, must be connected to each other, and to external lines, such as power lines, in a predetermined manner. A common method of interconnecting these wires is to run all the wires, both internal and external, into a housing, or terminal-box, afforded on the outside of the casing of the machine and make the necessary interconnections therein. For this purpose, the terminal-boxes heretofore known in the art, have customarily had a plurality of terminal posts therein to which the internal and external lead wires have been manually and individually attached in the proper combinations.

The combinations in which such wires are to be connected vary with the conditions under which the particular device is to be operated. Thus, for example, the wires of a polyphase motor which is intended to operate on 220 volts are customarily connected in different combinations than if the same motor is intended to operate on 440 volts, and the proper wiring of other dynamo-electric machines is similarly dependent on the conditions under which the machines are to be operated. Oftentimes, when dynamo-electric machines of this type are shipped from the factory or the like, the conditions under which the machine is to operate are not known to the shipper. For example, when a polyphase motor which is readily adapted to operate on either 220 or 440 volts is shipped, it oftentimes is not known at which voltage the motor is to be operated. As a result, it has been common practice in the past for factories, and the like, to ship dynamo-electric machines, such as polyphase motors, with the lead wires extending into the terminal-box of the machine but not connected therein, leaving the connecting of the wires to be performed by the operator of the machine, the wiring to be performed in accordance with the conditions under which the machine is to be operated. Such procedure places the burden upon the party receiving the machine to ascertain that the machine is properly wired. Machines of this character are, of necessity, somewhat complicated in nature and, therefore, it will be seen that this procedure may easily result in improper connection of the motor, because of inexperience or carelessness on the part of the person effecting the wiring, which will result in improper operation of the machine or possibly even damage thereto.

A primary object of my invention is to afford effective means for overcoming this difficulty.

An object ancillary to the foregoing is to enable dynamo-electric machines, such as polyphase motors, or the like, to be wired in such a manner that when it is desired to vary the voltage at which such a machine is to be operated, the necessary changes in the interconnection of the wires of the machine may readily be made in a novel and expeditious manner.

A further object of my invention is to enable the wiring of polyphase motors and the like to be readily varied for either high or low voltage operation by a simple manual movement of a novel actuating member embodied in the motor.

Yet another object of my invention is to afford a novel terminal block for quickly and easily effecting changes in the wiring of dynamo-electric machines of the multi-phase type to adapt the machine for either low voltage or high voltage operation.

Another object of my invention is to afford a terminal block which may be readily mounted in the terminal-box of a dynamo-electric machine and which, when so mounted in the terminal-box is automatically connected to the internal wiring of the machine, in a manner whereby the internal wiring of the machine may be quickly and easily varied in a novel and expeditious manner for high and low voltage operation.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

For the purpose of illustrating a preferred embodiment of my invention a terminal block 20, embodying the principles of my invention, is shown mounted in the terminal-box 22 of a multiphase motor 24.

Figure 4:
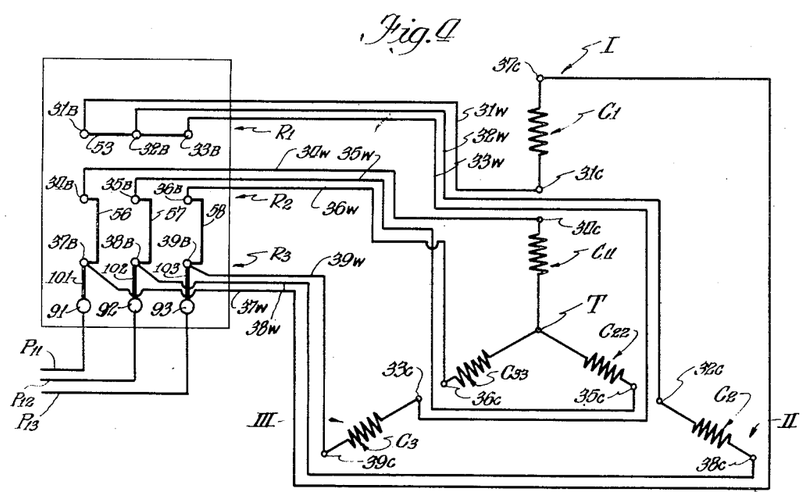
Fig. 4 is a wiring diagram illustrating the manner in which the terminal block is connected to the coils of the motor when the parts of the terminal block occupy the position shown in Figs. 1 and 2.
Figure 5:
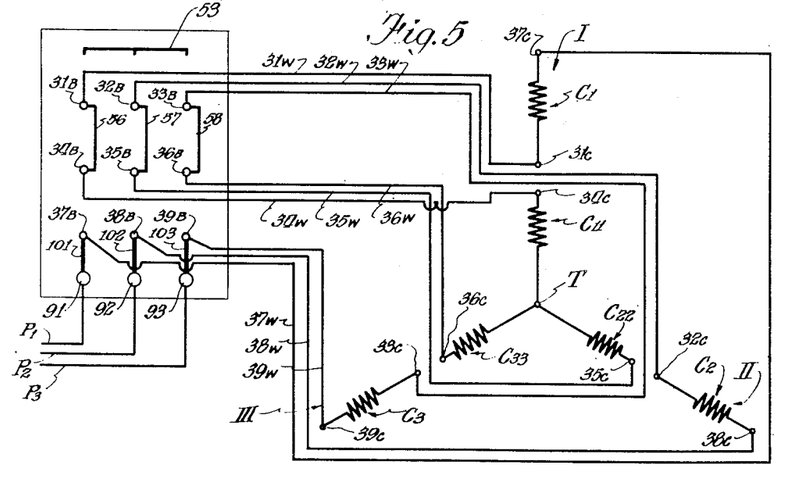
Fig. 5 is a wiring diagram illustrating the manner in which the terminal block is connected to the coils of the motor when the parts of the terminal block occupy the position shown in Fig. 3.

The motor 24 is of the two-winding, three-phase type, the phase groups I, II and III of the motor 24 being connected in star and each comprising a pair of coils or windings $C_1$ and $C_{11}$, $C_2$ and $C_{22}$, $C_3$ and $C_{33}$, respectively, Figs. 4 and 5.

Figure 2:
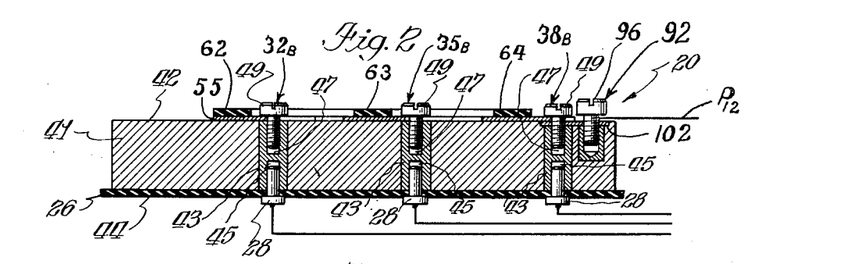
Fig. 2 is a detail sectional view taken substantially along the line 2—2 in Fig. 1.

The terminal-box 22 has a bottom wall 26, Fig. 2, made of suitable insulating material such as wood, rubber, or the like, and nine terminal pins 28 are mounted in the bottom wall 26 and extend therethrough in a manner well known to those skilled in the art, the terminal pins 28 being arranged in three parallel rows, or groups, $R_1$, $R_2$ and $R_3$ of three terminals each, with each of the terminal pins 28 in each of the three groups arranged in alignment with the pins corresponding thereto in each of the other groups, and with the three lines of pins disposed in parallel relation to each other.

Each of the coils $C_1$, $C_2$ and $C_3$, Figs. 4 and 5, have a terminal $31c$, $32c$ and $33c$, respectively, disposed on one end thereof and connected by lead wires $31w$, $32w$ and $33w$, respectively, to corresponding individual terminal pins 28 in row $R_1$. The coils $C_{11}$, $C_{22}$ and $C_{33}$ each have a terminal $34c$, $35c$ and $36c$, respectively, connected by wires $34w$, $35w$ and $36w$, respectively, to corresponding individual terminals 28 in row $R_2$. Likewise, the coils $C_1$, $C_2$ and $C_3$ also have terminals $37c$, $38c$ and $39c$, respectively, disposed on the end thereof opposite the terminals $31c$, $32c$ and $33c$, and the terminals $37c$, $38c$ and $39c$, are connected by wires $37w$, $38w$ and $39w$ to corresponding individual terminals 28 in row $R_3$. The ends of the coils $C_{11}$, $C_{22}$ and $C_{33}$, opposite the ends on which the terminals $34c$, $35c$ and $36c$ are disposed, are connected together at a common terminal T.

Thus it will be seen that when the motor is wired in accordance with the principles of my invention, the inner terminals $31c$, $32c$ and $33c$ of the outer coils $C_1$, $C_2$ and $C_3$, as viewed in Figs. 4 and 5, are permanently attached to corresponding individual terminal pins 28 in the outer row $R_1$; the outer terminals $34c$, $35c$ and $36c$ on the coils $C_{11}$, $C_{22}$ and $C_{33}$, as viewed in Figs. 4 and 5, are permanently attached to corresponding individual terminal pins 28 in the intermediate row $R_2$; and the outer terminals $37c$, $38c$ and $39c$ on the coils $C_1$, $C_2$ and $C_3$, as viewed in Figs. 4 and 5 are permanently attached to corresponding individual terminal pins 28 in the other outer row $R_3$. It is possible to permanently attach the lead wires $31w$—$39w$ to the terminal pins 28, because, when a terminal block, such as the block 20, embodying the principles of my invention, is used on the motor 24, it is unnecessary to change the lead wires $31w$—$39w$ of the motor from one terminal pin to the other, when changing the motor from high to low voltage operation, the terminal block 20 embodying means for quickly and easily effecting the necessary changes in the connections between the various terminal pins, as will be discussed in greater detail presently.

The terminal block 20 comprises a rectangular-shaped body member 41 which may be constructed from a sheet of suitable insulating material such as wood, rubber, or the like, the body member 41 having two oppositely disposed, and parallel, faces 42 and 44. Nine terminal posts $31_B$—$39_B$, respectively, are mounted in and extend through the body member 41 from the face 42 to the face 44, in spaced relation to each other corresponding to the spaced relation of the terminals 28 to each other. Each of the terminal posts $31_B$—$39_B$ includes a socket member 43, Fig. 2, and the socket members 43 each have a receptacle 45, formed in the end thereof adjacent the face 44, which is adapted to receive a corresponding one of said terminal pins 28 and to engage the latter in good electrical contact therewith. Each of the socket members 43 also has a receptacle 47 formed in the end thereof, adjacent the face 42 of the body member 41. The receptacles 47 are threaded internally and are adapted to operatively receive screws or bolts 49 for a purpose which will be discussed in greater detail hereinafter.

The body member 41 of the terminal block 20 is of such a size, and the socket members 43 are so disposed therein that the terminal block 20 may be mounted in the terminal-box 22 with the face 44 of the body member 41 disposed adjacent to the bottom wall 26 of the terminal-box 22 and with the socket members 43 disposed in operative engagement with the corresponding terminal pins 28. Thus it will be seen that with the terminal block 20 disposed in this manner within the terminal-box 22 the individual terminal pins 28 are in good electrical connection with the terminal posts $31_B$—$39_B$ so that interconnection of the screws 49 of the terminal posts $31_B$—$39_B$ is effective to interconnect the terminal pins 28 and, therefore, the windings $C_1$, $C_{11}$, $C_2$, $C_{22}$, $C_3$ and $C_{33}$, in a like manner.

A switching member 51, comprising a body member 53 to which four elongated contact members 55, 56, 57 and 58 are attached by any suitable means such as rivets 60, is mounted on the body member 41 and is adapted to be actuated in a manner whereby it is effective to vary the interconnection of the screws 49 and, therefore, the terminal posts 31B—39B, as will be discussed in greater detail presently. The body member 53 of the switching member 51 may be made of any suitable insulating material such as for example wood, rubber, or the like, and is substantially of lattice work construction, having three parallel cross arms 62, 63 and 64 interconnected by two longitudinally extending arms 66 and 67.

The contact member 55 is substantially E-shaped in form, the body portion of the E-shaped contact member 55 being connected by two of the rivets 60 to the lower surface of the cross-arm 62, exteriorly of but in parallel relation to the row R1 of terminal posts 31B, 32B and 33B. The legs of the E-shaped contact member 55 project toward the cross-arms 62 and 63, and afford contacts 71, 72 and 73 adapted to be moved into, and out of, engagement with the screws 49 on the terminal posts 31B, 32B and 33B, respectively, in row R1 on the terminal block 20, as will be discussed in greater detail presently.

The contact members 56, 57 and 58 are substantially identical in form, each comprising an elongated strip of suitable electrically conductive material such as for example copper. Each of the contact members 56, 57 and 58 is connected to the cross-arms 63 and 64 of the switching element 51 by an individual pair of rivets 60 and, thus, it will be seen that the switching member 51 comprises a unitary assembly wherein the body member 53 thereof and the contact members 55, 56, 57 and 58 are attached together by the rivets 60.

The contact members 56, 57 and 58 each have a longitudinally extending elongated slot 75, 76 and 77, respectively, formed in the central portion thereof and, when the switching element 51 is mounted in operative position on the body member 41 of the terminal block 20, the screws 49 in the terminals 34B, 35B and 36B extend through the slots 75, 76 and 77, respectively, and afford guide members for the movement of the switching element 51. The contact members 56, 57 and 58 are disposed between, and in alignment with the terminals 31B and 37B, 32B and 38B, and 33B and 39B, respectively, and are also disposed in alignment with the contacts 71, 72 and 73, respectively, on the contact member 55. Each of the contact members 56, 57 and 58 have two contacts 81 and 82, 83 and 84, and 85 and 86, respectively, disposed on opposite end portions thereof which are adapted to be moved into and out of engagement with the screws 49 on the terminals 31B and 37B, 32B and 38B, and 33B and 39B, respectively, upon predetermined movement of the switching member 51 as will be discussed in greater detail hereinafter.

From the foregoing it will be seen that the switching member 51 comprises a slide member mounted on the upper face 42 of the terminal block 20 and held thereon by the screws 49 in the terminals 34B, 35B and 36B, these screws acting both as connecting members effective to connect the contact members 56, 57 and 58 to the terminals 34B, 35B and 36B, respectively, and as guides which, in cooperation with the slots 75, 76 and 77, respectively, are effective to guide the switching member 51 in its sliding movement so as to insure straight-line movement of the switching member 51 back and forth between the terminal posts disposed in the rows R1 and R3.

Figure 1:
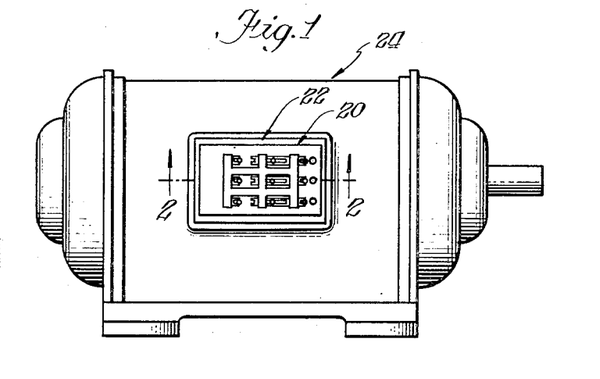
Fig. 1 is an elevational view of a motor showing a terminal block, embodying the principles of my invention, mounted thereon.

The elongated contact members 55, 56, 57 and 58 are so disposed on the body member 53 of the switching member 51, and the slots 75, 76 and 77 are of such length, that when the switching member 51 is disposed in the extreme right hand position shown in Fig. 1, wherein the contacts 82, 84 and 86 on the contact members 56, 57 and 58 are disposed in engagement with the screws 49 on the terminal posts 37B, 38B and 39B; the contacts 71, 72 and 73 on the contact member 55 are disposed in engagement with the screws 49 on the terminal posts 31B, 32B and 33B, respectively; and the contacts 81, 83 and 85 on the contact members 56, 57 and 58 are disposed in spaced relation to the latter terminal posts. When, on the other hand, the switching member 51 is disposed in the extreme left hand position, shown in Fig. 3, it will be seen that the contacts 81, 83 and 85 on the contact members 56, 57 and 58 are disposed in engagement with the screws 49 on the terminal posts 31B, 32B and 33B; the contacts 71, 72 and 73 are disposed in spaced relation to these latter terminal posts; and the contacts 82, 84 and 86 on the contact members 56, 57 and 58, respectively, are disposed in spaced relation to the terminal posts 37B, 38B and 39B.

Figure 3:
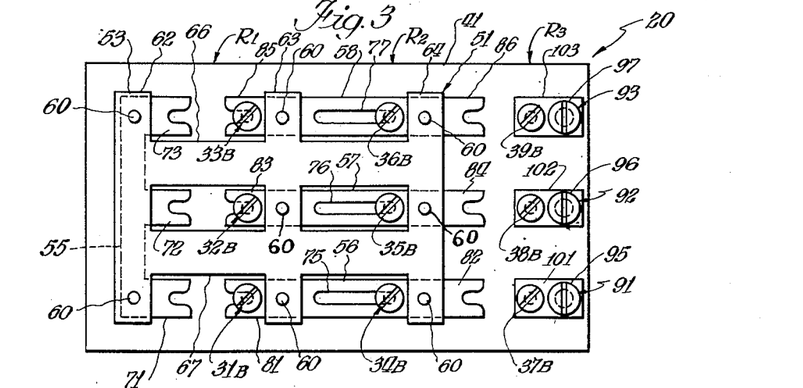
Fig. 3 is a top plan view of the terminal block shown in Fig. 2, but showing certain parts thereof in different operative positions.

In both of the aforementioned positions of the switching element 51 it will be seen that the contact members 56, 57 and 58 and, therefore, the contact members 81 and 82, 83 and 84, and 85 and 86, are connected at all times to the terminal post 34B, 35B and 36B, respectively, by the screws 49 which project through the slots 75, 76 and 77 formed in the aforesaid contact members. Thus it will be seen that movement of the switching member 51 into the right hand position shown in Fig. 1 is effective to interconnect the terminal posts 34B, 35B and 36B with the terminal posts 37B, 38B and 39B, respectively, and to connect the terminal posts 31B, 32B and 33B together; and movement of the switching member 51 into the extreme left hand position shown in Fig. 3, is effective to break the aforementioned interconnections of the terminals 31B—39B afforded by the position of the switching element 51 in the extreme right hand position, and, in place thereof, to interconnect the terminals 31B, and 34B, 32B and 35B, and 33B and 36B. Such movement of the switching element 51 is effective to vary the interconnection of the wiring of the motor 24 for low and high voltage operation, respectively, as will be presently discussed.

As previously mentioned, the motor 24 shown in the accompanied drawings is of the three-wire, three-phase, type, and provision has been made for connecting three power lines thereto. For this purpose I have provided three terminal posts 91, 92 and 93 comprising bolts or screws 95, 96 and 97 operatively mounted in the body member 41 of the terminal block 20, adjacent to the terminals 37B, 38B and 39B, respectively, and connected thereto by jumpers 101, 102 and 103, respectively. These terminal posts 91, 92 and 93 comprise the terminals to which outside wires may be connected for the normal operation of the motor 24, when my terminal block 20 is embodied therein and, of course, as will be obvious to those skilled in the art, in connecting the terminal posts 91, 92 and 93 to power lines, the proper individual one of each of the three power lines is connected to a corresponding one of the terminal posts 91, 92 and 93 by means of the bolts 95, 96 and 97, to thereby connect the terminals 37B, 38B and 39B, through the jumpers 101, 102 and 103, to the respective power lines.

Operation

With my novel terminal block, when it is desired to change from low voltage to high voltage operation of the motor 24, it is unnecessary for the operator to unfasten the lead wires $31w$—$39w$ from the individual terminal posts 28 to which they were fastened and then reconnect them to other terminal posts 28, as was heretofore the common procedure for making such a change-over. In a motor embodying my novel terminal block 20 when it is desired to "re-wire" a motor for either low or high voltage operation it is merely necessary to shift the switching member 51 to the proper position. This obviously affords a novel and expeditious means for accomplishing such re-wiring and eliminates the danger heretofore present that a workman, through inexperience or carelessness might re-wire the motor incorrectly with resultant improper operation of the motor and possible damage thereto.

Thus, for example, it will be seen that with the switching element 51 disposed in the extreme left hand position shown in Fig. 3 the motor 24 is wired for high voltage operation. This wiring of the motor 24 is best shown in Fig. 5 wherein it will be seen that power lines $P_1$, $P_2$ and $P_3$ are connected to the terminal posts 91, 92 and 93, respectively, and, therefore, through the jumpers 101, 102 and 103 to the terminal posts $37_B$, $38_B$ and $39_B$. With this positioning of the switching member 51 the terminal posts $31_B$, $32_B$ and $33_B$ are interconnected by the contact members 56, 57 and 58 to the terminal posts $34_B$, $35_B$ and $36_B$, respectively. Thus, it will be seen that the power line $P_3$ is connected through the terminal post 93, the jumper 103, the terminal post $39_B$, the wire $39w$, the terminal $39c$, the coil $C_3$, the terminal $33c$, the wire $33w$, the terminal post $33_B$, the contact member 58 of the switching member 51, the terminal post $36_B$, the wire $36w$, the terminal $36c$, and the coil $C_{33}$, to the central terminal T, thereby connecting the coils $C_3$ and $C_{33}$ in series; the power line $P_2$ is connected through the terminal post 92, the jumper 102, the terminal post $38_B$, the wire $38w$, the terminal $38c$, the coil $C_2$, the terminal $32c$, the wire $32w$, the terminal post $32_B$, the contact element 57 of the switching device 51, the terminal post $35_B$, the wire $35w$, the terminal $35c$, and the coil $C_{22}$, to the central terminal T, thereby, connecting the coils $C_2$ and $C_{22}$ in series; and the power line $P_1$ is connected through the terminal post 91, the jumper 101, the terminal post $37_B$, the wire $37w$, the terminal $37c$, the coil $C_1$, the terminal $31c$, the wire $31w$, the terminal post $31_B$, the contact element 56 of the switching element 51, the terminal post $34_B$, the wire $34w$, the terminal $34c$, and the coil $C_{11}$, to the central terminal T, thereby, connecting the coils $C_1$ and $C_{11}$ in series. Thus it will be seen that the three-phase groups of the motor 24 are connected in star with the two coils in each of the phase groups connected in series with each other and that therefore, the motor 24 is properly wired for high voltage operation, such as, for example, 440 volts.

If it is desired to operate the motor 24 on low voltage such as for example 220 volts, the "re-wiring" of the motor 24 may be readily accomplished by shifting the switching member 51 from the extreme left hand position shown in Figs. 3 and 5 to the extreme right hand position shown in Figs. 1 and 4. Such movement of the switching member 51 is effective to vary the wiring of the motor 24 from the star-series arrangement shown in Fig. 5, wherein the three-phase groups are arranged in star, with the individual coils of each phase group connected in series with the other coils of that group, to the star-parallel arrangement shown in Fig. 4 in which the individual coils within each phase group are connected in parallel with each other so that in the two-coil, three-phase arrangement shown in the drawings two parallel, star connections are afforded.

Thus, referring to Fig. 4 it will be seen that with the switching element 51 disposed in the aforementioned extreme right hand position, and with the three power lines $P_{11}$, $P_{12}$ and $P_{13}$ connected to the terminals 91, 92 and 93, the power lines $P_{11}$, $P_{12}$ and $P_{13}$ are connected through the terminals 91, 92 and 93, and the jumpers 101, 102 and 103, to the block terminal posts $37_B$, $38_B$ and $39_B$, respectively, and, in addition, are connected through the contact members 56, 57 and 58 to the terminal posts $34_B$, $35_B$ and $36_B$. With this interconnection of the terminal posts $37_B$, $38_B$ and $39_B$, and the terminal posts $34_B$, $35_B$ and $36_B$, to the power lines $P_{11}$, $P_{12}$ and $P_{13}$, it will be seen as will be discussed in greater detail presently, that two separate star connections are afforded in the motor 24, with the terminals $37_B$, $38_B$ and $39_B$ forming the outer terminals of one star connection and the contact element 53 affording the inner or central terminal thereof, and the terminals $34_B$, $35_B$ and $36_B$ affording the outer terminals of the other star connection and the terminal T affording the inner or central terminal thereof.

Thus it will be seen that the power line $P_{13}$ is connected through the terminal post 93, the jumper 103, the terminal post $39_B$, the line $39w$, the terminal $39c$, the coil $C_3$, the terminal $33c$, the line $33w$, the terminal post $33_B$, to the contact member 53; the power line $P_{12}$ is connected through the terminal post 92, the jumper 102, the terminal post $38_B$, the wire $38w$, the terminal $38c$, the coil $C_2$, the terminal $32c$, the wire $32w$, and the terminal post $32_B$, to the contact member 53; and the power line $P_{11}$ is connected through the terminal post 91, the jumper 101, the terminal post $37_B$, the wire $37w$, the terminal $37c$, the coil $C_1$, the terminal $31c$, the wire $31w$, and the terminal post $31_B$, to the contact member 53. Likewise, the power line $P_{13}$ is connected through the terminal post 93, the jumper 103, the terminal post $39_B$, the contact member 58, the terminal post $36_B$, the wire $36w$, the contact $36c$, and the coil $C_{33}$, to the central terminal T; the power line $P_{12}$ is connected through the terminal post 92, the jumper 102, the terminal post $38_B$, the contact member 57, the terminal post $35_B$, the wire $35w$, the terminal $35c$, and the coil $C_{22}$, to the central terminal T; and the power line $P_{11}$ is connected through the terminal post 91, the jumper 101, the terminal post $37_B$, the contact member 56, the terminal post $34_B$, the wire $34w$, the terminal $34c$, and the coil $C_{11}$, to the central terminal T. From the foregoing it will be seen that the motor 24, when wired as shown in Fig. 4, is arranged for efficient low voltage operation.

Modified form of terminal block shown in Figs. 6, 7, 7A, 8 and 8A

In Figs. 6, 7, 7A, 8 and 8A is shown a modified form of my invention comprising a terminal block which is especially well adapted for use in connecting the windings of a two-winding, three-phase type motor, wherein the phases are connected in delta.

In Figs. 6, 7, 7A, 8 and 8A, parts shown therein which are like parts shown in Figs. 1 to 5, inclusive, are indicated by the same reference numbers with the prefix "2" added to the numerical portion of the reference numbers.

The terminal block 220 shown in Figs. 6 to 8A, inclusive, like the terminal block 20 shown in Figs. 1 to 5, inclusive, comprises a rectangular-shaped body member 241 which may be constructed from a sheet of suitable insulating material, such as wood, rubber, or the like. Nine terminal posts 231B—239B, respectively, like the terminal posts 31B—39B extend through the body member 241 and are mounted therein in three parallel groups or rows $R_{21}$, $R_{22}$ and $R_{23}$ of three terminal posts each, each of the terminal posts in the rows $R_{21}$, $R_{22}$ and $R_{23}$ being disposed in alignment with corresponding terminal posts in the other two of the three rows.

Three terminal members 231'B, 232'B and 233'B are mounted on the base member 241 in a fourth row $R'_{21}$ adjacent to the row $R_{21}$ and in spaced parallel relation thereto. The terminal posts 231'B, 232'B and 233'B are connected to the terminal posts 231B, 232B and 233B, by jumpers 231J, 232J and 233J, respectively, extending across the lower face of the body member 241, Fig. 6, for purposes which will be discussed in greater detail hereinafter. Thus, it will be seen that the terminal block 220, like the terminal block 20, embodies, in effect, three rows of spaced terminal posts, the fourth row of terminal posts mounted on the base member 241 comprising, in effect, merely an extension of the row $R_{21}$, the terminal posts in the row $R'_{21}$ being permanently attached to selected posts in the row $R_{21}$.

It will be understood that each of the terminal posts 231B—239B, like the terminal posts embodied in the terminal block 20, includes a socket member having a receptacle formed in one end thereof which is adapted to receive a corresponding one of the terminal pins mounted in the terminal-box of a motor adapted to receive the terminal block 220, the terminal pins of such a motor being disposed in proper position in an insulating member, such as the member 26 in the motor 24, Fig. 1, so as to automatically engage in the receptacles in the terminal posts of the terminal block 220 when the terminal block 220 is mounted on the motor, as previously discussed in greater detail with respect to the mounting of the terminal block 20 on the motor 24.

Each of the terminal posts mounted in the terminal block 220, like the terminal posts mounted in the terminal block 20, has a screw 249 operatively mounted on the upper end portion thereof, affording an adjustable contact thereon.

A switching member 251, comprising a body member 253 to which three elongated contact members 256, 257 and 258 are attached by any suitable means such as rivets 260, is mounted on the body member 241 and is adapted to be actuated in a manner similar to that in which the switching member 51 on the terminal block 20 is actuated to thereby effect variations in the inter-connections of the screws 49 and, therefore, of the terminal posts 231B—239B. The body member 253 of the switching member 251 may be made of any suitable insulating material such as, for example, wood, rubber, or the like, and comprises two parallel cross-arms 262 and 264 interconnected by two longitudinally extending arms 66 and 67.

The contact members 256, 257 and 258 are substantially identical to each other in form, each comprising an elongated strip of suitable electrically conductive material such as for example, copper. The contact members 256, 257 and 258 are somewhat different in form than the contact members 56, 57 and 58 of the terminal block 20, as will be discussed in greater detail presently, but, like the contact members 56, 57 and 58, each are connected to the cross-arms 262 and 264 of the switching element 251 by an individual pair of rivets 60 so that the switching member 251 comprises a unitary assembly wherein the body member 253 and the contact members 256, 257 and 258 are permanently attached together.

Figures 6, 7:
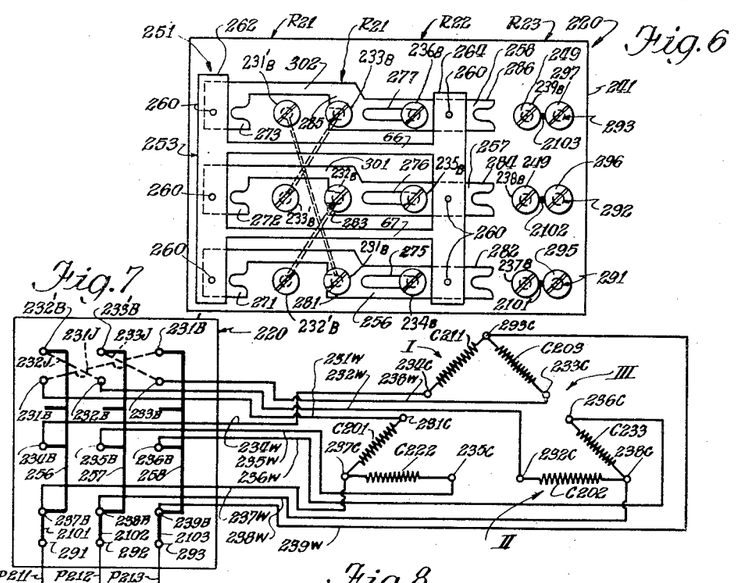
Fig. 6 is a top plan view of a modified form of terminal block embodying the principles of my invention.
Fig. 7 is a wiring diagram illustrating the manner in which the terminal block shown in Fig. 6 is connected to the coils of the motor when the parts of the terminal block occupy one operative position.

The contact members 256, 257 and 258 each have longitudinally extending elongated slots 275, 276 and 277, respectively, through which the screws 49 in the terminal posts 234B, 235B and 236B extend. The contact members 256, 257 and 258 are disposed in alignment with the terminals in row $R'_{21}$, $R_{21}$ and $R_{23}$, corresponding to the terminals 234B, 235B and 236B, respectively, to which they are attached. However, it will be noted that as best seen in Fig. 6, the contact members 256, 257 and 258 are somewhat different in shape than the corresponding contact members 56, 57 and 58 embodied in the terminal block 20. Thus, for example, it will be seen that the contact members 256, 257 and 258 have contacts 282, 284 and 286, respectively, formed on one end thereof which corresponds to the contacts 82, 84 and 86 of the terminal block 20 and which are adapted to be moved into and out of engagement with the terminal posts 237B, 238B and 239B. However, the other end of each of the contact members 256, 257 and 258 has a recess 300, 301 and 302, respectively, formed therein within which are formed pairs of contacts 281 and 271, 283 and 272, 285 and 273, respectively. As is best seen in Fig. 6, the two contacts in each of the pairs of contacts 273 and 285, 272 and 283, and 271 and 281, respectively, are disposed in alignment with each other and are adapted to be moved into and out of engagement with the terminal posts 231'B and 233B, 233'B and 232B, and 232'B and 231B, respectively, the recesses 300, 301 and 302 being of such size that when the contacts 281, 283 and 284 are disposed in engagement with the terminal posts 231B, 232B and 233B, respectively, the contacts 271, 272 and 273 are disposed in spaced relation to the terminal posts 232'B, 233'B and 231'B, respectively, and when the contacts 271, 272 and 273 are disposed in engagement with the terminal posts 232'B, 233'B, 231'B, the contacts 281, 283 and 285 are disposed in spaced relation to the terminal posts 231B, 232B and 233B. Also, it will be seen that the contact members 256, 257 and 258 are so constituted and arranged that when the contacts 271, 272 and 273 are disposed in engagement with the terminal posts 231'B—233'B, the contacts 282, 284 and 286 are disposed in engagement with the terminal posts 237B, 238B and 239B, whereas, when the contacts 281, 283 and 285 are disposed in engagement with the terminal posts 231B, 232B and 233B, contacts 282, 284 and 286 are disposed in spaced relation to the terminal posts 237B, 238B and 239B. It will be remembered that like the contact members 56, 57 and 58, the contact members 256, 257 and 258 are at all times in engagement with the terminal posts 234B, 235B and 236B.

Figures 7A, 8, 8A:
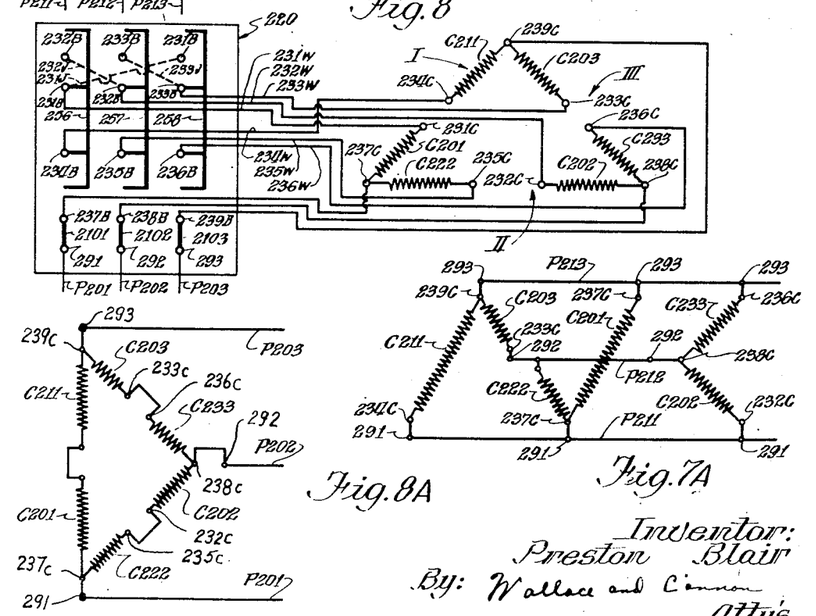
Fig. 7A is a simplified schematic diagram showing manner in which the windings of the motor are connected to the power lines in Fig. 7.
Fig. 8 is a wiring diagram illustrating the manner in which the terminal block shown in Fig. 6 is connected to the coils of the motor when the parts of the terminal block occupy another operative position.
Fig. 8A is a simplified schematic diagram showing the manner in which the windings of the motor are connected to the power lines in Fig. 8.

Thus it will be seen that the elongated contact members 256, 257 and 258 are so disposed on the body member 253 of the switching member 251 that when the switching member 251 is disposed in the position shown in Fig. 7, the contact members 256, 257 and 258 are effective to interconnect the terminal posts 232'$_B$, 234$_B$ and 237$_B$, 233'$_B$, 235$_B$ and 238$_B$, 231'$_B$, 236$_B$ and 239$_B$, respectively, whereas, when the switching member 251 is disposed in the position shown in Figs. 6 and 8, the engagement of contact members 256, 257 and 258 with the terminal posts 232'$_B$ and 237'$_B$, 233'$_B$ and 238$_B$, and 231'$_B$ and 239$_B$, respectively is broken and the contact members 256, 257 and 258 are then effective to interconnect the terminal posts 231$_B$ and 234$_B$, 232$_B$ and 235$_B$, 233$_B$ and 236$_B$, respectively.

As in the terminal block 220, three terminal posts 291, 292 and 293, including screws 295, 296 and 297 operatively mounted therein, are mounted in the body member 241 adjacent to the terminals 237$_B$, 238$_B$ and 239$_B$, respectively, and are connected thereto by jumpers 2101, 2102 and 2103. These terminal posts 291, 292 and 293 comprise the terminals to which the appropriate power lines may be connected to the terminal block 220 in the manner previously discussed with respect to the terminal block 20.

From the foregoing it will be seen that my novel terminal block 220, like the terminal block 20 includes a switching element which is operable to be shifted selectively into either one of two positions to thereby selectively interconnect various combinations of the terminal posts mounted in the base member of the terminal block. As previously discussed, it will be noted that the contact members 256, 257 and 258, like the contact members 56, 57 and 58 of the terminal block 20 are, at all times, in good electrical contact with the central terminal posts 234$_B$, 235$_B$ and 236$_B$ and are adapted to be moved into and out of engagement with the end terminals posts 237$_B$, 238$_B$ and 239$_B$ to which the power lines are attached through the jumpers 2101, 2102 and 2103 when my terminal block 220 is in operation.

Operation

It will be remembered that the terminal block 220 shown in the accompanying drawings is adapted for use on multiple-winding multi-phase dynamo-electric machines, such as, for example, motors and the like, wherein the windings of the machine are connected in delta. When so used, the terminal block 220 is mounted in a terminal-box such as the box 22 on the motor 24, Fig. 1, with the terminal posts 231$_B$—239$_B$ engaged with terminal pins disposed in proper position in the terminal-box of the motor, in the same manner as previously discussed in greater detail with respect to the terminal block 20 shown in Figs. 1 to 5 of the drawings. As in the case of the terminal block 20, when the novel terminal block 220 is used in a multiple-winding, multi-phase motor, wherein the windings are connected in delta, and when it is desired to change from low voltage to high voltage operation of the motor, it is unnecessary for the operator to unfasten the lead wires from the individual terminal posts and then reconnect the lead wires to the other terminal posts, as was heretofore the common procedure for making such a change-over. In a motor embodying my novel terminal block 220, when it is desired to "re-wire" a motor for either low or high voltage operation, it is merely necessary to shift the switching member 251 to the proper position. This obviously affords a novel and expeditious manner for accomplishing such re-wiring.

Thus, for example, it will be seen that, as will be presently discussed in greater detail, with the terminal posts 291, 292 and 293 connected to lead wires P211, P212 and P213, and with the switching element 251 disposed in the position shown in Fig. 7, the motor on which the terminal block 220 is mounted is wired for low voltage operation such as, for example, 220 volts; and with the terminal posts 291, 292 and 293 connected to the power lines P201, P202 and P203 and with the switching element 251 in the position shown in Fig. 8, the motor on which the terminal block 220 is mounted is wired for high voltage operation, such as, for example, 440 volts.

It will be noted that when the terminal block 220 is mounted on a motor in operative position, the terminal posts 231$_B$—239$_B$ are automatically interconnected through suitable terminal pins and internal wiring to predetermined coils or windings in the motor. Obviously, this interconnection of the individual terminal posts to the individual windings remains the same whether the switching member is in the position shown in Fig. 7 or Fig. 8. Thus, for example, it will be seen that as shown in Figs. 7 and 8, the terminal posts 231$_B$, 232$_B$ and 233$_B$ are connected by wires 231w, 232w and 233w to terminals 231c, 232c and 233c on windings $C_{201}$, $C_{202}$ and $C_{203}$ of phases I, II and III, respectively; the terminal posts 234$_B$, 235$_B$ and 236$_B$ are connected by wires 234w, 235w and 236w to terminals 234c, 235c and 236c on windings $C_{211}$, $C_{222}$ and $C_{233}$ of phases I, II and III, respectively; and terminals posts 237$_B$, 238$_B$ and 239$_B$ are connected by wires 237w, 238w and 239w to the terminals 237c, 238c and 239c on the windings $C_{201}$, $C_{202}$ and $C_{203}$ of phases I, II and III, respectively, and are connected through the jumpers 2101, 2102 and 2103 to the terminal posts 291, 292 and 293. These connections, as previously pointed out, remain the same whether the switching member 251 of the terminal block 220 is disposed in the low voltage operation-position shown in Fig. 7 or in the high voltage operation-position shown in Fig. 8. Thus it will be seen that the terminal posts 231$_B$, 234$_B$ and 237$_B$, disposed in alignment with each other, afford the terminal posts which are connected to the terminals 231c, 234c and 237c of the coils in phase I; the alined terminal posts 232$_B$, 235$_B$ and 238$_B$ afford the terminal posts which are connected to the terminals 232c, 235c and 238c of the windings in phase II; and the terminal posts 233$_B$, 236$_B$ and 239$_B$ afford the terminal posts which are connected at all times to the terminals 233c, 236c and 238c of the windings in phase III. Also it will be seen that the terminals 237c, 238c and 239c afford common terminals between the windings $C_{201}$ and $C_{202}$, $C_{202}$ and $C_{233}$, and $C_{203}$ and $C_{211}$, of phases I and II, and II and III, and III and I, respectively.

Referring now to Fig. 7, it will be seen that with the switching member 251 in the position shown therein, the individual windings of the three phases are each connected in parallel across corresponding pairs of the power lines P211, P212 and P213, as is schematically indicated in Fig. 7A. When so connected it will be seen that, as best shown in Fig. 7, the power line P211 is connected through the terminal post 291, the jumper 2101, the terminal post 237$_B$, the wire 237w, the terminal 237c, the coil $C_{201}$, the terminal 231c, the wire 231w, the terminal post 231$_B$, the jumper 231$_J$, the terminal post 231'$_B$, the contact member 256, the terminal post 239$_B$, the jumper 2103, and the terminal post 293 back to the power line P$_{213}$, thereby connecting the coil C$_{201}$ across the power lines P$_{211}$ and P$_{213}$. Inasmuch as the contact member 256, when disposed in the position shown in Fig. 7, also directly connects the terminal post 234$_B$ to the terminal post 237$_B$, it will also be seen that the coil C$_{211}$ of phase I is connected in parallel across the power lines P$_{211}$ and P$_{213}$, this connection extending from power line P$_{211}$ through the terminal post 291, the jumper 2101, the terminal post 237$_B$, the contact member 256, the terminal post 234$_B$, the wire 234w, the terminal 234c, the coil C$_{211}$, the terminal 239c, the wire 239w, the terminal post 239$_B$, the jumper 2103, and the terminal post 293 to the power line P$_{213}$.

In a similar manner, the coils C$_{202}$ and C$_{222}$ of phase II are connected between the power lines P$_{212}$ and P$_{211}$, the circuit through the coil C$_{202}$ being from the power line P$_{212}$ through the terminal post 292, the jumper 2102, the terminal post 238$_B$, the wire 238w, the terminal 238c, the coil C$_{202}$, the wire 232w, the terminal post 232$_B$, the jumper 232$_J$, the terminal post 232'$_B$, the contact member 256, the terminal post 237$_B$, the jumper 2101, and the terminal post 291, to the power line P$_{211}$; and the circuit through the coil C$_{222}$ being from the power line P$_{212}$ through the terminal post 292, the jumper 2102, the terminal post 238$_B$, the contact member 257, the terminal post 235$_B$, the wire 235w, the terminal 235c, the coil C$_{222}$, the terminal 237c, the wire 237w, the terminal post 237$_B$, the jumper 2101, and the terminal post 291 to the power line P$_{211}$.

Also the coils C$_{203}$ and C$_{233}$ of phase III are connected in parallel across the power lines P$_{213}$ and P$_{212}$, the circuit through the coil C$_{203}$ being from the power line P$_{213}$ through the terminal post 293, the jumper 2103, the terminal post 239$_B$, the wire 239w, the terminal 239c, the coil C$_{203}$, the terminal 233c, the wire 233w, the terminal post 233$_B$, the jumper 233$_J$, the terminal post 233'$_B$, the contact member 257, the terminal post 238$_B$, the jumper 2102, the terminal post 292, to the power line P$_{212}$; and the circuit through the coil C$_{233}$ being from the power line P$_{213}$ through the terminal post 293, the jumper 2103, the terminal post 239$_B$, the contact member 258, the terminal post 236$_B$, the wire 236w, the terminal 236c, the coil C$_{233}$, the terminal 238c, the wire 238w, the terminal post 238$_B$, the jumper 2102, and the terminal post 292, to the power line P$_{212}$.

Thus it will be seen that with the switching member 251 disposed in the position shown in Fig. 7 each of the windings C$_{201}$, C$_{202}$, C$_{203}$, C$_{211}$, C$_{222}$ and C$_{233}$, are connected in parallel across corresponding pairs of the power lines P$_{211}$, P$_{212}$ and P$_{213}$ for low voltage operation.

If it is desired to operate the motor, to which the terminal block 220 is connected, on high voltage such as for example on 440 volts, the "rewiring" of the motor may be readily accomplished by shifting the switching member 251 from the position shown in Fig. 7 to the position shown in Fig. 8. Such movement of switching member 251 is effective to vary the wiring of the motor from the delta-parallel arrangement shown in Figs. 7 and 7A, wherein the three phase-groups are arranged in delta, with individual coils of each phase connected in parallel with the other coils of that phase, to the delta series arrangement shown in Figs. 8 and 8A in which the individual coils within each phase-group are connected in series with each other so that a delta connection is afforded wherein each of the windings in each phase are in series with the other windings in that phase.

Thus, referring to Fig. 8, it will be seen that with the switching member 251 disposed in a position in which it is shown therein, and with the three power lines P$_{201}$, P$_{202}$ and P$_{203}$ connected to the terminals 291, 292 and 293, a delta-series circuit is afforded for the three phases of the dynamo-electric machines to which the terminal block 220 is attached. For example, it will be seen that a circuit is established through the phase I from the power line P$_{201}$ to the power line P$_{203}$, this circuit extending from the power line P$_{201}$ through the terminal post 291, the jumper 2101, the terminal post 237$_B$, the wire 237w, the terminal 237c, the coil C$_{201}$, the terminal 231c, the wire 231w, the terminal post 231$_B$, the contact member 256, the terminal post 234$_B$, the wire 234w, the terminal 234c, the coil C$_{211}$, the terminal 239c, the wire 239w, the terminal post 239$_B$, the jumper 2103, and the terminal post 293, to the power line P$_{203}$, to thereby connect the coils C$_{201}$ and C$_{211}$ of phase I in series across the power lines P$_{201}$ and P$_{203}$ as indicated in Fig. 8A. Similarly, a circuit is established from the power line P$_{202}$, through the coils C$_{202}$ and C$_{222}$, of group II to the power line P$_{201}$, this circuit extending from the power line P$_{202}$, through the terminal post 292, the jumper 2102, the terminal post 238$_B$, the wire 238w, the terminal 238c, the coil C$_{202}$, the terminal 232c, the wire 232w, the terminal post 232$_B$, the contact member 257, the terminal post 235$_B$, the wire 235w, the terminal 235c, the coil C$_{222}$, the terminal 237c, the wire 237w, the terminal post 237$_B$, the jumper 2101, and the terminal post 291, to the power line P$_{201}$, to thereby connect the coils C$_{202}$ and C$_{222}$ of the phase I in series across the power lines P$_{202}$ and P$_{201}$ as indicated in Fig. 8A. At the same time it will be noted that a circuit is established through the coils C$_{203}$ and C$_{233}$ of phase III, which circuit extends from the power line P$_{203}$, through the terminal post 293, the jumper 2103, the terminal post 239$_B$, the wire 239w, the terminal 239c, the coil C$_{203}$, the terminal 233c, the wire 233w, the terminal post 233$_B$, the contact member 258, the terminal post 236$_B$, the wire 236w, the terminal 236c, the coil C$_{233}$, the terminal 238c, the wire 238w, the terminal post 238$_B$, the jumper 2102, and the terminal post 292, to the power line P$_{202}$, to thereby connect the coils C$_{203}$ and C$_{233}$ of phase III in series across the power lines P$_{203}$ and P$_{202}$ as shown in Fig. 8A.

From the foregoing it will be seen that the switching member 251 is effective to be moved into and out of engagement with the terminal posts 237$_B$, 238$_B$ and 239$_B$, in a manner similar to that in which the switching member 51 of the terminal block 20 is effective to be moved into and out of engagement with the terminal posts 36$_B$, 37$_B$ and 39$_B$ and, like the switching member 51 of the terminal block 20, is effective when moved into engagement with the terminal posts 237$_B$, 238$_B$ and 239$_B$, to connect the individual windings of the various phases in parallel across the power lines and, on the other hand, when moved to operative position out of engagement with the terminal posts 237$_B$, 238$_B$ and 239$_B$ is effective to connect the plurality of windings in each individual phase group in series with the other windings in that group and across the power lines connected to the terminal block.

From the foregoing it will be seen that I have afforded a novel terminal block whereby the wiring of a motor may be varied in a novel and expeditious manner for operation of the motor on either high or low voltage.

Also it will be seen that I have afforded a novel terminal block which eliminates the necessity for extensive and relatively complicated re-wiring of a motor when the motor is being switched from operation on high voltage to operation on low voltage, or vice versa, and which latter procedure has been most common heretofore.

Furthermore it will be seen that I have provided a novel terminal block wherein it is unnecessary to remove any part thereof from the motor during such a changeover from high to low voltage operation, or vice versa, and which is efficient and practical in operation and may be economically produced commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. A terminal block for use in a dynamo-electric machine of the type including a plurality of machine winding terminals disposed in predetermined relation to each other, said terminal block comprising an insulating member adapted to be disposed on said machine in predetermined position, a plurality of terminal members disposed on said insulating member in spaced relation to each other and in position to operatively engage corresponding ones of said winding terminals when said insulating member is disposed in said predetermined position on said machine, and a switching member mounted on said insulating member, said switching member being movable relative to said insulating member into operable engagement with a plurality of predetermined combinations of certain ones of said terminal members to thereby electrically connect all of said terminal members together in a plurality of predetermined relationships when said insulating member is disposed in said predetermined position on such a machine.

2. A terminal block for use in a dynamo-electric machine of the type including three phases and wherein each phase comprises two windings, said terminal block comprising an insulating member, a plurality of terminal members mounted on said insulating member in a plurality of spaced rows of three terminal members for operative connection to selected ends of said windings, means including selected ones of said terminal members for connecting power lines to such windings, said plurality of terminal members being operable, when so operatively connected to said windings, and when connected together in one combination, to connect such phases across respective pairs of such power lines with each winding in each phase connected in parallel with the other winding in that phase, said plurality of terminal members being operable, when so operatively connected to said windings, and when connected together in another combination, to connect such phases across respective pairs of such power lines with each winding in each phase in series with the other winding in that phase, and a switching member mounted on said insulating member and movable thereon into two operative positions, said switching member including a plurality of conductor members disposed thereon in position to connect said terminal members in said one combination when said switching member is disposed in said one position, said conductor members being disposed on said switching member in position to connect said terminal members in said other combination when said switching member is disposed in said other position.

3. A terminal block for use in a dynamo-electric machine of the type including a plurality of windings, said terminal block comprising an insulating member, a plurality of terminal members mounted on said insulating member and adapted to be connected to selected ones of said windings, said terminal members being disposed on said insulating member in spaced relation to each other and in a plurality of groups also disposed in spaced relation to each other, and a switching member mounted on said insulating member in electrical contact with said terminal members in one of said groups and movable relative thereto into operable engagement with a plurality of predetermined combinations of terminal members in the other of said groups to selectively connect said terminal members in said one group and terminal members in said other groups together in a plurality of predetermined relationships and thereby connect the said windings in corresponding predetermined relationship when said terminal members are connected to said selected ones of said windings.

4. A terminal block for use in a dynamo-electric machine of the type including a plurality of machine winding terminals disposed in predetermined relation to each other, said terminal block comprising an insulating member adapted to be disposed on said machine in predetermined position, a plurality of terminal members disposed on said insulating member in spaced relation to each other and in relation to operatively engage corresponding ones of said winding terminals when said insulating member is disposed in said predetermined position on said machine, and a switching member slidably mounted on said insulating member, means on said insulating member for guiding said switching member, said switching member being slidably movable along said guide means on said insulating member into operable engagement with a plurality of predetermined combinations of said terminal members to thereby electrically connect said terminal members together in a plurality of predetermined relationships when said terminal members are so operatively engaged with said winding terminals.

5. A terminal block for use on a dynamo-electric machine of the three phase type and having two windings in each phase, said terminal block comprising an insulating base, a plurality of terminal members mounted on said base, in spaced relation to each other and in a plurality of groups of three terminal members each, said terminal members being adapted to be connected to selected ones of said windings, each of the terminal members in each of the groups having a corresponding terminal member in each of the other groups and being disposed on said base in alignment with said corresponding terminal members in said other groups, and a switching member mounted on said base, said switching member comprising an insulating member and a plurality of electrical contact members disposed thereon in spaced relation to each other, said contact members being disposed on said insulating member in a manner to afford three lines of four electrical contacts each, each of said lines of electrical contacts being disposed in alignment with a respective one of said lines of corresponding terminal members, and said switching member being movable on said base into two operative positions, said switching member being operable when moved into one of said positions to dispose certain of said contact members in engagement with corresponding ones of said terminal posts in a manner effective to connect the windings in each of said phases in such a machine in series, and said switching member being operable when moved into the other of said positions to dispose certain of said contact members in engagement with corresponding ones of said terminal posts in a manner effective to connect the windings in each of said phases of such a machine in parallel.

6. A terminal block for use on a dynamo-electric machine of the type including a plurality of machine windings, and a plurality of terminal members, each of said terminal members being connected to a predetermined end of one of said windings, said terminal block comprising an insulating base adapted to be disposed in predetermined position on such a machine, a plurality of terminal posts mounted on and extending through said base in spaced relation to each other, each of said terminal posts being disposed on said base in position to operatively engage corresponding individual ones of the said terminal members of such a machine when said base is disposed in said predetermined position on said machine, and a switching member mounted on said base, said switching member comprising an insulating member and a plurality of metal contact members mounted on said insulating member in spaced relation to each other, said switching member being slidable on said base into a plurality of predetermined positions to thereby dispose contact members on said switching member in engagement with a corresponding plurality of predetermined combinations of said terminal posts.

7. A terminal block for use on dynamo-electric machines of the type including a plurality of machine windings, said terminal block comprising a base comprised of an electrical-insulating material, a plurality of terminal members mounted on said base and adapted to be connected to the said windings of such a motor, said terminal members being disposed on said base in spaced relation to each other and in a plurality of groups, and a switching member mounted on said base and movable thereon between said groups of terminal members, said switching member including a plurality of electrical-contact members movable therewith into engagement with different groups of said terminal members for connecting terminal members in selected ones of said groups in a predetermined plurality of combinations.

8. A terminal block for use on a dynamo-electric machine of the two-winding, three-phase type, wherein the phases are connected in star, said terminal block comprising an insulating base, nine terminal members mounted on said base in spaced relation to each other and in three groups of three terminal members each, said terminal members being adapted to be connected to predetermined ends of the windings in such a motor, and a switching member movably mounted on said base and having a plurality of contact members disposed in predetermined positions thereon, said switching member being movable into two operative positions on said base for switching the windings in each phase between series and parallel connections when said terminal members are so connected to such windings, said switching member being operable when moved into one of said positions to dispose predetermined ones of said contact members in engagement with corresponding ones of said terminal posts in a manner effective to directly connect the terminal members in one of said groups to terminal members in one of the other two of said groups, and said switching member being operable when moved into the other of said positions to dispose predetermined ones of said contact members in engagement with corresponding ones of said terminal posts in a manner effective to directly connect the terminal members in said first mentioned one group to the terminal members in the second one of the other two of said groups.

9. A terminal block for use in a three-phase dynamo-electric machine of the type having a first and a second winding in each phase, and wherein each winding has a first and second end, and wherein the said first ends of all the said first windings are connected together at all times, said terminal block comprising an insulating base, three groups of terminal members mounted in said base, said terminal members being disposed in spaced relation to each other, and each of said groups comprising three terminal members, each of said terminal members in one of said groups being adapted to be connected to the second end of a corresponding one of the said second windings in the machine, each of said terminal members in another of said groups being adapted to be connected to the first end of a corresponding one of the said second windings in the machine, and each of said terminal members in the third of said groups being adapted to be connected to the second end of a corresponding one of the said first windings in the machine, and a switching member mounted on said base and movable thereon into two predetermined positions, said switching member including a plurality of contact members so disposed relative to each other that, when said switching member is disposed in one of said predetermined positions on said base, said contact members are effective to interconnect the individual ones of said terminal members in said third group with said corresponding individual ones of said terminal members in said other of said groups, and, when said switching member is disposed in the other of said predetermined positions on said base, said contact members are effective to interconnect the individual ones of said terminal members in said third group with said corresponding individual ones of said terminal members in said one of said groups, and to connect all of said terminal members in said other of said groups together.

10. A terminal block for use on a dynamo-electric machine of the three-phase type having a first and second winding in each of the phases, each of the windings having a first and second end thereon, and wherein the phases are connected in star with the second ends of all of the said first windings in the machine attached together at all times, said terminal block comprising an insulating base, nine terminal members mounted on said base in spaced relation to each other and in two end groups and an intermediate group of three terminal members each, each of the terminal members in each of the groups having a corresponding terminal member in the other two of said groups, each of the terminal members in each of said groups being disposed on said base in alignment with said corresponding terminal members in the other two of said groups and in a manner to afford three parallel lines of three corresponding terminal members, each of said terminal members in one of said end groups being adapted to be connected to the said second end of a predetermined corresponding one of said second windings, each of said terminal members in the other of said end groups being adapted to be connected to the said first end of the said second winding to which the corresponding terminal member in said one end group is attached, and each of said terminal members in said intermediate group being adapted to be attached to the said first end of the said first winding in that phase in which the said second winding, attached to said corresponding terminal members in said end groups, is located, means for attaching said terminal members in said other end group to individual power lines, and a switching member mounted on said base for interconnecting said terminal members thereon in different predetermined arrangements, said switching member comprising an insulating member and a plurality of contact members mounted thereon, said switching member being movably mounted on said base with selected ones of said contact members attached at all times to individual corresponding terminal members in said intermediate group, said switching member being movable into two operative positions on said base and being operable when disposed in one of said positions on said base to dispose said contact members attached to said individual terminal members of said intermediate group in spaced relation to said terminal members in said other end group and in engagement with corresponding terminal members in said one end group, to thereby interconnect said terminal members on said base in a manner effective to connect said first and second windings of each of said phases in series when said windings are attached to said terminal members, and said switching element being operative when disposed in the other of said two positions to dispose said contact members attached at all times to said terminal members in said intermediate group in spaced relation to said terminal members in said one end group and in contact with the corresponding ones of said terminal members in said other end group, and to dispose another one of said plurality of contact members in engagement with all of said terminal members in said one end group, to thereby interconnect said terminal members on said base in a manner effective to interconnect said first and second windings of each of said phases in parallel relation to each other when said windings are connected to said terminal members.

11. A terminal block for use on a dynamo-electric machine of the three-phase type, wherein each of the phases comprise a first and a second coil, and wherein each of the coils have an inner and outer end and the inner end of all of said first coils are connected together, said terminal block comprising an insulating base, nine terminal members mounted on said base in spaced relation to each other and in three parallel rows of three terminal members each, each of the terminal members in each of the rows having a corresponding terminal member in each of the other rows and being disposed on said base in alignment with said corresponding terminal members in the other two of the said three rows, each of said terminal members in one of the end rows of said three rows being adapted to be connected to the said outer end of a corresponding one of the said second coils, each of said terminal members in the other end row of said three rows being adapted to be connected to the said inner end of the said second coil to which the corresponding terminal member in said one end row is connected to the outer end thereof, and each of said terminal members in the intermediate one of said three rows being adapted to be connected to the outer end of the said first coil in the same phase as the second coil to which the corresponding terminal members in said end rows are connected, means for interconnecting said terminal members in said one row to individual power lines, and a slide member extending between said three rows and comprising an insulating member having four elongated contact members mounted thereon in spaced relation to each other, one of said contact members being disposed on said insulating member in parallel alignment with said other of said end rows of terminal members and on the opposite side thereof from said intermediate row, each of the other three of said contact members being secured to and slidably mounted on a corresponding one of said terminal members in said intermediate row and being disposed thereon in alignment with the corresponding terminal members in said two end rows of terminal members, said slide member being movable transversely to said three rows of terminal members into a position wherein said one contact member is disposed in spaced relation to all of said terminal members on said base, said other three contact members are disposed in spaced relation to all the terminal members in said one end row, and each of said other three contact members are disposed in engagement with the said corresponding terminal member in said intermediate row and with said terminal member corresponding thereto in said other end row, to thereby afford series connections for the first and second coils in each of said phases, and said slide member being movable transversely to said three rows of terminal members into a position wherein said one contact member is disposed in engagement with all of said terminal members in said other row, said other three contact members are disposed in spaced relation to all the terminal members in said other row, and each of said other three contact members are disposed in engagement with the said corresponding terminal member in said intermediate row and with said terminal member corresponding thereto in said one end row, to thereby afford parallel connections for the first and second coils in each of said phases.

12. A terminal block for use in a dynamo-electric machine of the type including a plurality of machine winding terminals disposed in predetermined relation to each other, said terminal block comprising a sheet of di-electric material adapted to be disposed in predetermined position on said machine, a plurality of terminal members extending through said sheet between the faces thereof, each of said terminal members comprising a socket member having a terminal-receptacle in the end thereof adjacent to one of the faces of said sheet, and a screw member mounted in and projecting outwardly from the other end thereof adjacent to the other of the faces of said sheet, each of said terminal-receptacles being adapted to receive a corresponding one of the winding terminals of such a machine, and said terminal members being disposed in said sheet in spaced relation to each other and in position to operatively engage each of said winding terminals in said terminal-receptacle in a corresponding one of said terminal members when said sheet is disposed in said predetermined position on said machine, and a switching member for electrically connecting said terminal members together in a plurality of predetermined relationships, said switching member comprising a plurality of elongated metal contact members disposed on said other face of said sheet, and an insulating member attached to said contact members, said switching member being slidable on said other face of said sheet into a plurality of operative positions thereon, said elongated contact members being disposed on said insulating member in a manner whereby movement of said insulating member into each of said operative positions is effective to move said contact members into engagement with predetermined terminal members to thereby electrically connect said terminal members in a corresponding one of said predetermined relationships, selected ones of said contact elements having elongated slots therein, and predetermined ones of said terminal members being engaged at all times with corresponding ones of said selected contact members within said slots to thereby connect said predetermined terminal members to said corresponding ones of selected contact members at all times and be effective to guide said switching member in its sliding movement on said other face of said sheet.

13. A terminal block of the type adapted to be used on a dynamo-electric machine of the multiple winding, multi-phase type, said terminal block comprising an insulating base, twelve terminal members mounted on said base in spaced relation to each other, said terminal members being disposed on said base in four parallel rows of three terminal members each, said terminal members in each of said rows being disposed on a line with the corresponding terminal member in each of the other of said rows, and a switching member mounted on said base, said switching member comprising an insulating member and three elongated contact members mounted thereon, each of said contact members being disposed in alignment with said corresponding terminal members in a respective one of said lines and having a recess formed in one end portion thereof, said switching member being disposed on said base with corresponding terminal members in one of said end rows and one of the intermediate rows disposed within the recess in the corresponding one of said contact members, the terminal members in the other of the intermediate rows in engagement with the corresponding contact members, and the terminal members in the other end row disposed in alignment with the corresponding contact members adjacent the end thereof opposite the end having the recess formed therein, said switching member being movable into a plurality of operative positions on said base, and said contact members being movable therewith into engagement with different combinations of said terminal members for connecting said terminal members in a plurality of predetermined combinations.

14. A terminal block for use in a dynamo-electric machine of the three-phase type wherein each phase includes two windings each having inner and outer ends, and the phases are connected in delta, with each of the outer ends of each of the windings connected to a conductor member in common with the outer end of a winding in another phase, said terminal block comprising an insulating base, a plurality of terminal members mounted on said base in spaced relation to each other and in four parallel rows of three terminal members each, each said terminal members in one of the end rows being adapted to be connected to a respective power line and to one of such conductor members, each of said terminal members in one of the intermediate rows being adapted to be connected to the inner end of a winding in a respective phase, each of the terminal members in the other of the intermediate rows being adapted to be connected to the inner end of the other winding in a respective phase, means electrically connecting each of the terminal members in the other end row to a selected one of said terminal members in said other intermediate row, and a switching member movably mounted on said base and having a plurality of contact members disposed in predetermined positions thereon, said switching member being movable into two operative positions on said base, said switching member being operable when moved into one of said positions to dispose said contact members in engagement with said terminal posts in a manner effective to connect each winding in each of said phases between a pair of such power lines and in parallel with the other winding in said phase, said switching member being operable when moved into the other of said positions to dispose said contact members in engagement with said terminal posts in a manner effective to connect each winding in each of said phases between a pair of such power lines and in series with the other winding in said phase.

15. The terminal block defined in claim 14 and wherein each of said terminal members in each of said four rows is disposed in position wherein corresponding to the position of a terminal member in each of the other rows, and wherein said corresponding terminal members in said rows are disposed in alignment with each other, and wherein said switching member comprises an insulating member and three contact members mounted thereon, each of said contact members being disposed in alignment with a selected one of said lines of corresponding terminal members and being slidably connected to the terminal post in said selected line and in said one intermediate row to thereby slidably mount said switching member on said base, said contact members being so disposed on said insulating member that when said switching member is disposed in said one position on said base said contact members are in spaced relation to said corresponding terminal members in said other intermediate row and in engagement with said corresponding members in said one intermediate row and both of said end rows, and when said switching member is disposed in said other position on said base said contact members are in spaced relation to said corresponding terminal members in both of said end rows and in engagement with said corresponding terminal members in both of said intermediate rows.

16. In a dynamo-electric machine of the type including three phases and in which each phase comprises two windings, an insulating member, a plurality of terminal members mounted on said insulating member in spaced relation to each other along three substantially parallel lines, predetermined ones of said terminal members along each of said lines being connected to respective individual ends of said windings, and a switching member slidably mounted on said insulating member for reciprocating movement longitudinally of said lines between two operative positions, said switching member when in one of said positions being disposed in operable engagement with one combination of said terminal members whereby each of said windings are connected in parallel to the other winding in the same phase, said switching member when in the other of said positions being disposed in operable engagement with another combination of said terminal members whereby each of said windings are connected in series to the other winding in the same phase.

17. A terminal block for use in a dynamoelectric machine of the three-phase, two-winding type for selectively controlling the operative connection of the windings of such a motor, said terminal block comprising an insulating base, nine terminal members mounted on said base for connection to predetermined ones of the said windings of such a machine, said terminal members being disposed in three groups of three terminal members each with each of said groups comprising two outside terminal members and an intermediate terminal member, and means comprising a switching member for selectively interconnecting said terminal members in a plurality of combinations to thereby correspondingly interconnect the aforesaid windings of such a machine when the latter are connected to said terminal members, said switching member comprising an insulating member and a plurality of conductor members mounted on said insulating member and affording twelve electrical contacts disposed on said insulating member in three rows of four contacts each, each of said rows comprising two outside contacts and two intermediate contacts, one of said intermediate contacts in each of said rows being slidably mounted on said one intermediate terminal member in a corresponding one of said groups for slidably and guidingly supporting said switching member between two operative positions on said base, one of said outside contacts and both of said intermediate contacts of each of said rows being electrically interconnected in both of said operative positions of said switching member, said twelve contacts being so disposed on said insulating member that movement of said switching member between said two operative positions is effective to move said outside contacts at one end of said rows into and out of engagement with said outside terminal members in corresponding ones of said groups, and to move the other of said intermediate contacts into and out of engagement with the other of said outside terminal members in said corresponding groups, and to move the other of said outside contact members into and out of predetermined electrical connection with said other outside terminal members in said corresponding groups, said twelve contacts being so disposed relative to said terminal members and each other that, when said switching member is disposed in one of said operative positions said other outside contacts are disposed in said electrical connection with said corresponding other outside terminal members, said one outside contacts are disposed in engagement with said corresponding one outside terminal members, and said other intermediate contacts are disposed out of engagement with said corresponding other intermediate terminal members, and when said switching member is disposed in the other of said operative positions said other outside contacts are disposed out of said electrical connection with said corresponding other outside terminal members, said one outside contacts are disposed out of engagement with said corresponding one outside terminal members, and said other intermediate contacts are disposed in engagement with said corresponding other outside terminals.

PRESTON BLAIR.

REFERENCES CITED

The following references are of record in the file of this patent:

UNITED STATES PATENTS

| Number | Name | Date |
|---|---|---|
| 263,554 | McCabe et al. | Aug. 29, 1882 |
| 1,123,321 | Lamme | Jan. 5, 1915 |
| 1,393,822 | Parker | Oct. 18, 1921 |
| 1,502,909 | Deflassieux | July 29, 1924 |
| 1,608,613 | Oswald | Nov. 30, 1926 |
| 1,701,382 | Macmillan | Feb. 5, 1929 |
| 2,057,525 | Horning | Oct. 13, 1936 |
| 2,319,490 | Clark | May 18, 1943 |

FOREIGN PATENTS

| Number | Country | Date |
|---|---|---|
| 373,153 | Great Britain | May 17, 1932 |
| 568,582 | France | Dec. 24, 1923 |